United States Patent Office 2,846,407
Patented Aug. 5, 1958

2,846,407

METHOD OF MAKING A DETERGENT AND SOLVENT RESISTANT SPONGE MATERIAL

Christopher Lumley Wilson, Columbus, Ohio

No Drawing. Application January 13, 1954
Serial No. 403,935

7 Claims. (Cl. 260—2.5)

This invention relates to a method of making an improved sponge material, and more particularly, to an improved method of treating a certain type of sponge material in order to make it more detergent and solvent resistant. The invention also relates to the product resulting from the improved method.

In U. S. Patent 2,609,347, issued September 2, 1952, to Christopher L. Wilson, there is described and claimed a method of making a sponge material having interconnected pores. This sponge material comprises a reaction product of polyvinyl alcohol and formaldehyde made by forming a froth in a mixture of polyvinyl alcohol containing less than 10% residual hydrolyzable material in the molecule, formaldehyde, an acid catalyst in which the acid functional group is inorganic and having a dissociation constant of at least $10^{-2}$ and a froth stabilizing wetting agent soluble in and substantially stable to this solution. The froth is allowed to gel and solidify with the production of interconnected pores simultaneously with the progress of reaction, the froth being formed prior to appreciable reaction between the polyvinyl alcohol and formaldehyde and the reaction being stopped when approximately 35 to 80% of the hydroxyl groups of the polyvinyl alcohol have been combined with formaldehyde.

Sponges made in accordance with above mentioned patent have many desirable properties which make them greatly preferred for most uses over natural sponges and artificial sponges made by other processes. The polyvinyl sponges have a very high abrasion resistance, a high resistance to rupture by twisting, a large absorptive capacity for water and a high tensile strength that is substantially uniform in all directions. The sponges are also desirably soft and resilient when wet.

Although the sponges described in the Wilson Patent referred to have the desirable properties enumerated, they have certain disadvantages. One of these is that they are adversely affected by some organic solvents and by strong aqueous solutions of certain detergents. The organic solvents are all aqueous mixtures of solvents which are miscible with water, such as acetone, methyl and ethyl alcohols and the like. The detergents which adversely affect the sponges are usually of the ionic type, such as the alkyl-aryl sulfonate type, and they only have this undesirable effect if they are used in strengths several times that recommended by the manufacturer for cleaning purposes. If the sponges are used in solutions of excess strength, they are attacked by the detergent, usually within an hour at ordinary temperature, and become swollen, gelatinous and may even eventually disintegrate completely and become dispersed in the detergent solution. Solutions of detergents of sufficient concentration for all ordinary cleaning purposes do not, as a rule, have any adverse effect on the sponges. It is only when the user employs solutions many times as strong as that recommended that the weakness is apparent.

An improved method of making a sponge of the general type described in the previously mentioned Wilson Patent, but resulting in a product having improved solvent and detergent resistance, is described and claimed in U. S. Patent 2,653,917, issued September 29, 1953, to Henry G. Hammon. The method described in the Hammon patent is similar to that of the Wilson patent except that instead of reacting polyvinyl alcohol alone with formaldehyde, part of the formaldehyde is replaced with a dialdehyde or, alternatively, instead of a dialdehyde, part or all of the polyvinyl alcohol may be replaced by the polyaldehyde compound resulting from the hydrolysis of the copolymer of allylidene diethoxide and vinyl acetate or the copolymer of allylidene diacetate and vinyl acetate.

It has now been found that the solvent and detergent resistance of the polyvinyl formal sponge made by the processes of the above two patents can be further improved if the completed sponge is given an after-treatment with certain dialdehydes.

Accordingly, one object of the present invention is to provide an improved method of making polyvinyl alcohol-formaldehyde sponges having good detergent and solvent resistance.

Another object of the invention is to provide a method of making polyvinyl formal sponges having substantially improved solvent and detergent resistance.

A further object of the invention is to provide an improved method of increasing the solvent and detergent resistance of polyvinyl formal sponges, which method is easy to carry out.

Still a further object of the invention is to provide a simple and inexpensive method of making polyvinyl formal sponges which are resistant to the action of aqueous-organic solvent mixtures and relatively strong solutions of many detergents.

These and other objects of the invention will be readily apparent from the detailed description of preferred methods of carrying out the process which follows:

A feature of the present invention comprises treating sponge material comprising polyvinyl alcohol having about 35 to 80% of its hydroxyl groups combined with formaldehyde, with a dialdehyde having more than two carbon atoms, and in the presence of a mineral acid catalyst, such that the product contains not more than about 4% by weight of the combined dialdehyde.

Preferred examples of sponge treatment in accordance with the present invention are as follows:

*Example 1.*—A sponge made as described in the Wilson Patent 2,609,347 and measuring 4½ x 3 x 1½ inches when dry, and weighing about 20 grams, was immersed in a solution containing 250 ml. 15% sulfuric acid by weight and 5 g. maleic dialdehyde at 68° F. for three hours. The sponge was frequently squeezed so that the dialdehyde came into intimate contact with the sponge material. At the end of the period the sponge was well washed with water until all the acid had been removed. The resulting sponge was unaffected by immersion in a 5% solution of a commercial alkyl-aryl sulfonate solution and only slightly weakened by standing in a mixture of 80% ethyl alcohol and 20% water.

*Example 2.*—A sponge of the same type as described in Example 1 but measuring 7 in. thick was compressed to about ½ inch in an aqueous solution containing 15% sulfuric acid by weight and 1% succinic dialdehyde by weight. The solution was warmed to about 85° F. and the compression force removed, thus allowing the sponge to absorb the acid solution. The pressure was again applied and the sponge removed from the solution in the compressed state. The pressure was removed and the sponge allowed to stand at the temperature indicated for half an hour, after which it was well washed with water to remove acid and unreacted aldehyde. Under these conditions, up to about 1 gram of the dialdehyde combines with each 100 gm. dry sponge.

Crude succinic dialdehyde may be used or any compound which will furnish succinic dialdehyde by hydrolysis in the acid medium. Such a compound is 2,5-diethoxy-tetrahydrofuran.

Higher percentages of succinic dialdehyde may be used in the acid treating solution in order to increase the amount of dialdehyde which has reacted or decrease the time required for the desired effect to be attained. The best results are obtained, however, if not more than about 4 gm. of dialdehyde are combined with each 100 gm. of dry sponge. With too much dialdehyde the sponge becomes hard and inflexible when wetted with water. With too little dialdehyde, detergent and solvent resistance is decreased.

*Example 3.*—A sponge similar to that described in Example 1 was allowed to absorb some of a solution containing 250 ml. 15% by weight sulfuric acid and 10 gm. malonic dialdehyde. After frequent squeezing at 68° F. for 3 hrs., the sponge was well washed. It showed very good resistance to 5% aqueous alkyl-aryl sulfonate solution even after 3 hours immersion at room temperature.

*Example 4.*—A sponge of the same type as in Example 1 was similarly compressed in a solution containing 15% sulfuric acid by weight and 1% by weight glutaric dialdehyde. Most of the acid liquor was removed by squeezing and the sponge left for half an hour at 85° F. It was then well washed as before. About 0.2 gm. of the dialdehyde had been combined with the sponge material.

The detergent resistance of the treated sponge may be tested in a number of ways. One of these is to cut strips of dry sponge say ⅛ inch x ⅛ inch by 2 inches and suspend them under their own weight in a solution of sodium alkyl-aryl sulfonate of about 5% strength. Such a material is known on the market as Nacconol NRSF. Untreated sponge material swells and after about two hours is almost dispersed. Sponges treated as above exhibit little or no swelling or disintegration. Solvent resistance is tested in a similar way by replacing the detergent with an 80% by volume solution of ethyl alcohol-in-water. With these organic-aqueous mixtures, swelling is much more rapid than with the detergents. The treated sponges show very little effect of these solvents.

Some of the dialdehydes which have been found to impart resistance to polyvinyl formal sponges in accordance with the invention are maleic, succinic, malonic, alpha-hydroxyadipic, glutaric and glutaconic. Other dialdehydes may be used but glyoxal has been found to impart no resistance. It is thought that the function of the dialdehyde is to furnish cross links by reaction with hydroxyl groups in neighboring polyvinyl alcohol chains and for this purpose certain geometrical requirements are believed necessary. It is thought that the length of the glyoxal molecule is not sufficient to span the distance between the chains. On the other hand, there does not seem to be an upper limit to the size of the dialdehyde molecule for use in the present invention. When it is very long it can, presumably, fold up but still span the neighboring chains.

The different dialdehydes have optimum concentrations at any particular temperature and time of treatment in order to produce the optimum effect. Under the same conditions, succinic dialdehyde reacts much faster than maleic dialdehyde so that protection is attained both more rapidly and more completely. Mixtures of more than one dialdehyde may be used. The attainment of resistance is faster the higher the concentration of dialdehyde. With double the concentration the time is about halved. Since the dialdehydes are somewhat unstable in acid solution, it is preferable not to use concentrations of dialdehydes much greater than those mentioned in the examples.

Acid catalysts other than sulfuric may be used although sulfuric is the cheapest and most convenient. Phosphoric or hydrochloric acids may be employed, or any other acid catalyst which can be used for the reaction of polyvinyl alcohol with formaldehyde. These catalysts are discussed in the Wilson patent referred to above. The speed of reaction with dialdehyde is increased as the concentration of acid catalyst is increased. At higher concentrations than the 15% mentioned in the examples some formaldehyde is removed from the sponge material. This is undesirable. At lower concentrations the reaction time is unduly prolonged. Thus, at 7% sulfuric acid, the desired protection is only attained after about four times the reaction period required for 15% acid concentration. The treatment may take place at room temperature. The reaction takes place more rapidly at elevated temperatures, however. The temperature must not be so high that permanent damage to the sponge results. Thus, at temperatures above 135° F. in aqueous solutions, there is a danger of permanent distortion of the sponge shape. Treatment with dialdehydes may be satisfactorily carried out at temperatures up to about 120° F. with safety. The reaction as described in Example 2 requires about one hour at room temperature (65° F.) and about 5 minutes at 120° F. Under more drastic conditions the danger of formaldehyde removal is more serious and the dialdehyde itself also decomposes more rapidly. The conditions given in the examples are chosen to give rapid protection with minimum loss of materials.

It is necessary that the dialdehyde used be soluble in the acid medium chosen for the treatment.

What is claimed is:

1. A method of increasing the detergent and organic solvent resistance of a sponge comprising a reaction product of polyvinyl alcohol and formaldehyde in which 35 to 80% of the hydroxyl groups of said polyvinyl alcohol have been reacted, comprising immersing said sponge in an aqueous solution of a dialdehyde containing more than two carbon atoms per molecule, in the presence of a mineral acid catalyst, at a concentration of said dialdehyde, immersion temperature and over a time correlated to react from about 0.2 to about 4.0 grams of dialdehyde per 100 grams of sponge.

2. A method according to claim 1 in which said dialdehyde is glutaric dialdehyde.

3. A method according to claim 1 in which said dialdehyde is maleic dialdehyde.

4. A method according to claim 1 in which said dialdehyde is malonic dialdehyde.

5. A method according to claim 1 in which said dialdehyde is succinic dialdehyde.

6. A method according to claim 5 in which said mineral acid is sulfuric.

7. A method of increasing the detergent and organic solvent resistance of a sponge comprising polyvinyl alcohol chemically combined with formaldehyde to the extent of 35 to 80% of the hydroxyl groups of said alcohol, comprising treating said sponge with an aqueous solution comprising about 15% sulfuric acid by weight and about 1% succinic dialdehyde by weight at a temperature of about 85° F. for about one-half hour, and then washing out said acid and unreacted dialdehyde.

References Cited in the file of this patent

UNITED STATES PATENTS

| | | |
|---|---|---|
| 2,387,831 | Cogan et al. | Oct. 30, 1945 |
| 2,609,347 | Wilson | Sept. 2, 1952 |
| 2,653,917 | Hammon | Sept. 29, 1953 |

FOREIGN PATENTS

| | | |
|---|---|---|
| 573,966 | Great Britain | Dec. 14, 1945 |